United States Patent Office.

EUGENIO BOUGLEUX AND ALBERTO BOUGLEUX, OF LIVORNO, ITALY.

PROCESS OF STERILIZING CORN FOR MAKING DOUGH.

SPECIFICATION forming part of Letters Patent No. 607,981, dated July 26, 1898.

Application filed December 10, 1897. Serial No. 661,416. (No specimens.) Patented in Italy June 14, 1897, No. 42,312.

*To all whom it may concern:*

Be it known that we, EUGENIO BOUGLEUX and ALBERTO BOUGLEUX, subjects of the King of Italy, residing in the city of Livorno, Province of Livorno, Italy, have invented certain new and useful Improvements in the Treatment of Grains for Alimentary Purposes, (patented in Italy, No. 42,312, June 14, 1897,) of which the following is a specification.

The present invention relates to improvements in the process of treating grain; and its object is to improve in quality and in hygienic respects the alimentary products obtained with the various flours by eliminating all heterogeneous elements, which have but slight nourishing qualities and are difficult to assimilate, by destroying injurious germs which may be contained therein, and by kneading the flours in such a manner as to obtain a better product.

We shall explain the process with regard to Indian corn or maize, though it will be easily understood that the same process can be readily employed for other kinds of grain.

In the process the corn undergoes successively the following operations: Placing it first into any of the ordinary machines employed to shell or clean the corn, it comes out clean outwardly. After this first operation the corn is placed into a bath of a liquid which has sterilizing properties, but which is entirely harmless to health, such as disulfite of soda. The corn comes out of this bath with its ball and germs somewhat toughened. Then let the corn stand for awhile and then subject it to the action of steam to warm it. After this treatment the corn is passed to a grinding apparatus of ordinary or improved construction, and it is then passed through bolters or sifters, which free it of the bran and almost completely of germs. After this first working it is once more sterilized by heating it under exposure to the heat of a suitable apparatus of any kind. Then the corn is placed into a second and finer grinding apparatus and so ground entirely. Then it is again sifted and a sterilized flour absolutely free of bran and germs is obtained. This flour is now ready for kneading, and this can be accomplished by the ordinary methods, only adding to the water a certain quantity of some liquid possessing glutinous properties and which is harmless to health. A certain quantity of flour of hard corn may be added, which contains much gluten, so as to obtain a better consistence of the dough. We prefer to make the dough with boiling water, and to improve it we employ hot steam, which we leave to act upon the flour, which has been either moistened or heated while it is agitated or shaken by mechanical means or other processes in the kneading apparatus.

Under this process the product obtained is absolutely sterilized and healthful, solid and compact, and it can be easily transported and preserved for long periods of time.

We claim—

A system of treating grain for the production of alimentary articles consisting in subjecting the wheat or grain, which has been lightly shelled and cleaned, to a sterilizing-bath of bisulfite of soda; then subjecting it to heat; then grinding it; following this by bolting or sifting and repeating the sterilization by reheating; then finishing the grinding and purification by sifting, thus obtaining sterilized flour; substantially as described.

In witness whereof we have hereunto signed our names in the presence of two subscribing witnesses.

EUGENIO BOUGLEUX.
ALBERTO BOUGLEUX.

Witnesses:
ROBERTO CANTIR,
EMILIO MASI.